United States Patent [19]
Dlugos

[11] Patent Number: 5,770,864
[45] Date of Patent: Jun. 23, 1998

[54] APPARATUS AND METHOD FOR DIMENSIONAL WEIGHING UTILIZING A LASER SCANNER OR SENSOR

[75] Inventor: Daniel F. Dlugos, Shelton, Conn.

[73] Assignee: Pitney Bowes Inc., Stamford, Conn.

[21] Appl. No.: 775,850

[22] Filed: Dec. 31, 1996

[51] Int. Cl.$^6$ .................................................. G01N 21/86
[52] U.S. Cl. ............................... 250/559.19; 250/559.21; 356/379
[58] Field of Search .................... 250/559.19, 559.21, 250/559.22, 559.26; 356/72, 372, 379, 380, 383, 384, 387

[56] References Cited

U.S. PATENT DOCUMENTS

| | | | |
|---|---|---|---|
| 3,819,918 | 6/1974 | Hale | 250/223 R |
| 4,718,507 | 1/1988 | Howlett et al. | 177/210 |
| 4,914,307 | 4/1990 | Kanev | 250/559.19 |
| 5,004,929 | 4/1991 | Kakisoki et al. | 250/559.19 |
| 5,121,328 | 6/1992 | Sakai et al. | 364/464 |
| 5,264,665 | 11/1993 | Delfer, III | 177/25.15 |
| 5,325,178 | 6/1994 | Louis et al. | 356/381 |
| 5,331,118 | 7/1994 | Jensen | 177/25.14 |
| 5,477,622 | 12/1995 | Skalnik | 33/781 |
| 5,523,835 | 6/1996 | Tanaka | 356/5.05 |
| 5,528,517 | 6/1996 | Loken | 364/560 |

*Primary Examiner*—Que Lee
*Attorney, Agent, or Firm*—Robert H. Whisker; Melvin J. Scolnick

[57] ABSTRACT

The invention is a method and apparatus for measuring the dimensions of a parcel. The method comprises a series of steps utilizing the apparatus for determining each of the relevant dimensions of the parcel. The steps begin with the placing of a parcel on a flat surface in a field of measurement; the flat surface can be the weighing surface of a scale for calculating the parcel weight. A laser scanner is positioned and then rotated within its position so as to locate the lead and trail edges of the parcel, the left and right sides, and the top and bottom edges. The positioning data is then transmitted to a data processor which calculates the length, width, and height of the parcel. A conveyor belt for transporting the parcel to the measurement field can be utilized. A laser beam is transmitted toward a mirror so that the parcel must pass the mirror while the parcel is on the conveyor belt. The mirror is further positioned so that the laser beam is deflected toward an encoder bar located on the surface of the conveyor belt. During the transmission of the laser beam, a count is established which corresponds to a predetermined measurement scale. The count is continued until the transmission of the laser beam to the encoder bar is broken by passage of the parcel across the laser beam; the count continues when the beam is no longer blocked. The length and height of the parcel can then be determined.

19 Claims, 6 Drawing Sheets

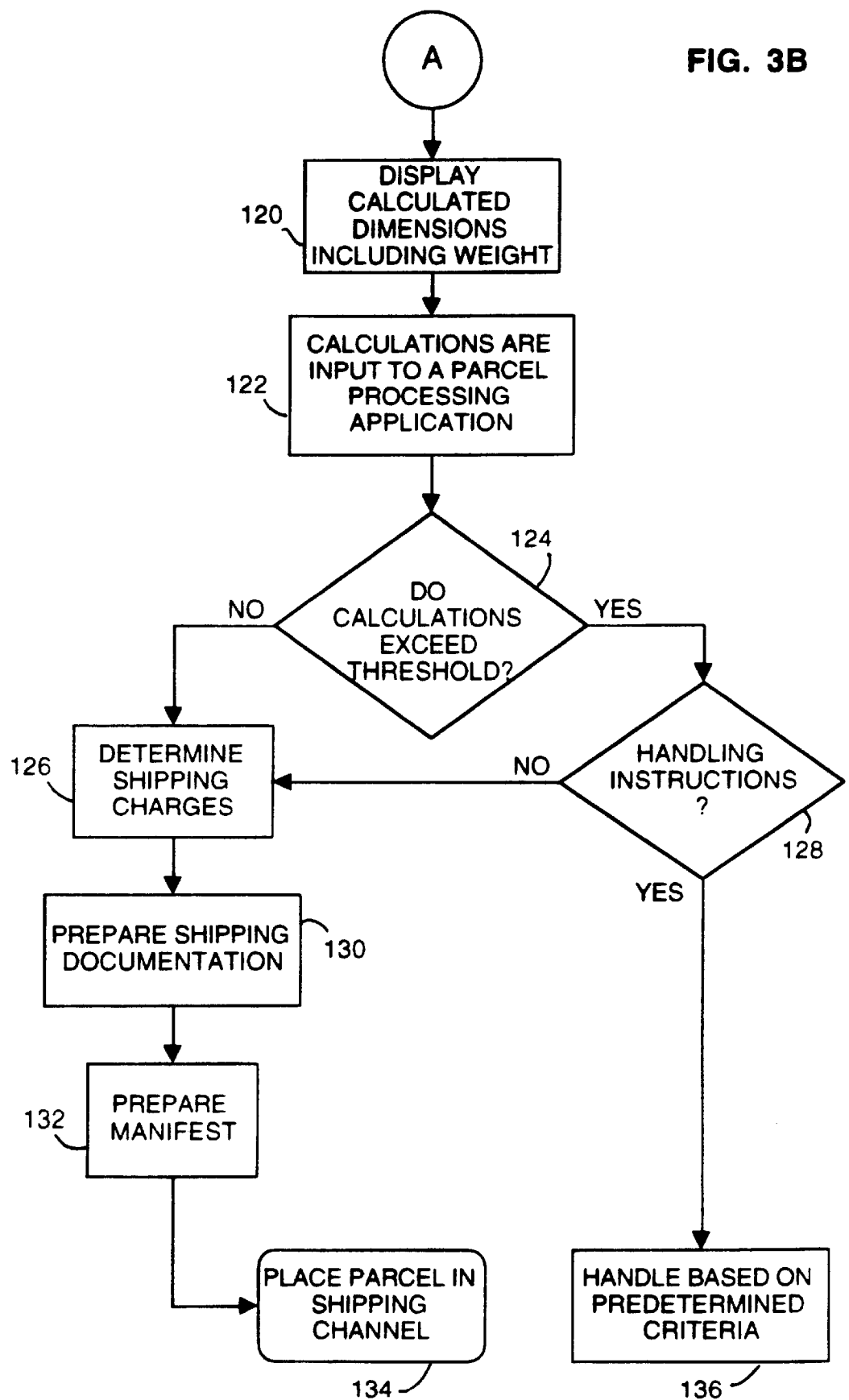

APPARATUS AND METHOD FOR DIMENSIONAL WEIGHING UTILIZING A LASER SCANNER OR SENSOR

RELATED APPLICATIONS

Reference is made to application Ser. No. 08/775,672 (Attorney Docket No. E-377), entitled METHOD FOR DIMENSIONAL WEIGHING UTILIZING POINT DETERMINATION, assigned to the assignee of this application and filed on even date herewith.

Reference is made to application Ser. No. 08/775,673 (Attorney Docket No. E-378), entitled METHOD FOR DIMENSIONAL WEIGHING UTILIZING SPACED LINE PROJECTION, assigned to the assignee of this application and filed on even date herewith.

Reference is made to application Ser. No. 08/775,671 (Attorney Docket No. E-379), entitled METHOD FOR DIMENSIONAL WEIGHING WITH OPTICS, assigned to the assignee of this application and filed on even date herewith.

Reference is made to application Ser. No. 08/775,549 (Attorney Docket No. E-383), entitled LOW COST DIMENSIONAL DETERMINING SYSTEM, assigned to the assignee of this application and filed on even date herewith.

Reference is made to application Ser. No. 08/775,851 (Attorney Docket No. E-384), entitled COARSE VOLUME MEASUREMENT WITH INTERLOCK, assigned to the assignee of this application and filed on even date herewith.

Reference is made to application Ser. No. 08/775,675 (Attorney Docket No. E-385), entitled AUTOMATIC DIMENSIONAL WEIGHING, assigned to the assignee of this application and filed on even date herewith.

Reference is made to application Ser. No. 08/775,550 (Attorney Docket No. E-386), entitled DIMENSIONAL WEIGHING UTILIZING A FOLLOWING ARM MECHANISM, assigned to the assignee of this application and filed on even date herewith.

Reference is made to application Ser. No. 08/775,214 (Attorney Docket No. E-387), entitled DIMENSIONAL WEIGHING UTILIZING A LINEAR DISPLACEMENT TRANSDUCER, assigned to the assignee of this application and filed on even date herewith.

Reference is made to application Ser. No. 08/775,213 (Attorney Docket No. E-422), entitled APPARATUS AND METHOD FOR DIMENSIONAL WEIGHING UTILIZING A ROTATING SENSOR, assigned to the assignee of this application and filed on even date herewith.

Reference is made to application Ser. No. 08/775,674 (Attorney Docket No. E-430), entitled APPARATUS AND METHOD FOR DIMENSIONAL WEIGHING UTILIZING A MIRROR AND/OR PRISM, assigned to the assignee of this application and filed on even date herewith.

BACKGROUND OF THE INVENTION

The shipping of goods from point A to point B has been a continual challenge to commerce. In recent years, with the development of certain efficiencies of transport and materials handling, carriers have been able to offer shippers mixed modes of transport, overnight delivery, better tracking of parcel movement, and discount rates in return for the utilization of labor and cost saving measures such as: bar coding; bulk delivery; and pre-sorting.

One of the efficiencies of operation is the use of dimensional determination. Carriers have a need to accurately determine the amount of capacity required to meet shipping demands. By determining dimensions other than, or in addition to, weight, then shippers can pack goods more efficiently (i.e., build a pallet according to the needs of the transport mode) and carriers can fill a shipping container (ship, rail, truck, air) more efficiently.

Carrier rates based on dimensional determination generally reward shippers for labeling parcels with dimensional characteristics or for separating out those parcels not meeting certain dimensional prerequisites. The technology associated with dimensional determination has proliferated as the requirements have grown. However, the essential movement of packages at a shipper site have remained the same; packages must still move through a prep area where identification labels of varied type are applied to the parcel, and where manifests can be assembled even if they are downloaded elsewhere. Package movement through the prep area is facilitated by chutes, conveyors, rollers, or simply through human intervention with the occasional platform for weighing, measuring, or marking.

Dimensional determination is employed in various manners. U.S. Pat. No. 5,004,929 for an OPTICAL SYSTEM FOR DETECTING THREE-DIMENSIONAL SHAPE; issued Apr. 2, 1991 to Kakinoki et al. (Kakinoki) is an example of dimensional determination designed to fit a specific need. In the case of Kakinoki, for instance, laser optics is employed to detect and measure a three dimensional shape. Kakinoki is important in its use of light power to compare images of items so that quality production can be maintained over a series of measured objects. If the images match, then the quality is maintained. Dimensional determination for shipping, however, is based on comparison of each object to be measured with a pre-existing but separate measuring standard. Kakinoki, on the other hand, compares each object being detected with other objects of its type, to determine a deviation.

U.S. Pat. No. 5,331,118 for a PACKAGE DIMENSIONAL VOLUME AND WEIGHT DETERMINATION SYSTEM FOR CONVEYORS, was issued Jul. 19, 1994 to Soren Jensen (Jensen). Jensen discloses a system for determining the dimensions of a parcel moving on a conveyor belt. The parcel passes over a strip with indicia indicating units of incremental measure to determine a width, and alongside a similar strip to determine height. The length of the parcel is determined by interrupting the path of a photo-electric eye. Weight is determined by using a weigh-in-motion conveyor scale. The Jensen disclosure provides a good example of how parcel handling is enhanced through the use of simple techniques that do not require a profusion of new hardware or cause parcel movement to be inefficient.

There is a need however, to reduce the great profusion of reader arrays by utilizing a single beam source for detecting measurement points; and, if a conveyor belt is being utilized, a system that provides a qualifying measurement to determine whether package movement along the production line can be pre-empted to remove or re-direct non-qualifying parcels would create an efficiency without driving up cost.

The ability to continuously monitor a field to be measured is known in the art; consider U.S. Pat. No. 5,325,178 for a METHOD OF MEASURING THE DIMENSIONS OF MOVING OBJECTS, issued on Jun. 28, 1994 to Louis et al. (Louis). Louis teaches that the length, width, and height of objects on a conveyor belt can be determined by utilizing fixed position CCD cameras to measure along predefined axes. The disadvantage to Louis is that the measuring devices (i.e., the CCD cameras) are siting along fixed lines, and therefore, objects of varied dimension can not be accurately measured.

Thus, an object of the present invention is to provide a cost effective means for determining the dimensions of a parcel. The ability of the shipper to enjoy reductions in rates from carriers by implementing certain efficiencies in operation, and to do so without slowing work flow or driving up costs, is a distinct advantage to be gained by the system user.

SUMMARY OF THE INVENTION

According to the invention, the object is achieved and the disadvantages of the prior art are overcome by a method and apparatus for measuring the dimensions of a parcel. The invention method comprises a series of steps for determining each of the relevant dimensions of the parcel.

The steps begin with the placing of a parcel on a flat surface in a field of measurement; the flat surface upon which the parcel is placed can be the weighing surface of a scale capable of calculating the weight of the parcel. A laser scanner is positioned either above or below the surface position of the parcel and is further positioned behind the parcel.

The laser scanner is rotated within its position so as to locate the lead and trail edges of the parcel; the positioning data is then transmitted to a data processor which calculates the length of the parcel by calculating the distance from the lead edge to the trail edge. The laser scanner is then rotated within its position so as to locate the left side and then the right side of the parcel. The positioning data for the left and right sides is transmitted to the data processor for calculating the width of the parcel. Finally, the laser scanner is rotated within its position so as to locate the top edge and the bottom edge of the parcel; transmitting the position points to the data processor and them calculating the height of the parcel by calculating the distance from the parcel top edge to the parcel bottom edge.

As is apparent to those skilled in the art, the sequence of determining the length, width, and height of the parcel can be varied depending upon the needs of the system or its users.

The calculated length, width and height of the parcel can then be displayed on a monitor and/or transmitted to a parcel processing system. Additionally, if the flat surface of the measuring field upon which the parcel was placed is the weighing surface or platter of a weighing scale, then the calculated weight can be displayed on the monitor as well and/or transmitted to a parcel processing system.

The method utilizes a minimum of required hardware while leaving open the possibilities for optional hardware and processing capability. The apparatus for measuring the dimensions of the parcel include means for supporting the parcel for measurement; this supporting means can be any flat surface capable of meeting the rigors of parcel handling. A preferred embodiment of the invention, however, utilizes the weighing surface or platter of a weighing scale as the flat surface. The use of a scale allows the system to calculate the weight of the placed parcel.

The apparatus further includes a laser scanner means for rotatably scanning a predetermined field for measurement data wherein the measurement data is representative of the parcel's length, width, and/or height. A calculator means is provided for calculating the parcel's length, width, and/or height from the measurement data. And, additionally, a data processing means is provided. The data processing means: controls the rotating movement of the laser scanner; receives and processes the measurement data from the laser scanner; transmits the measurement data to the calculator means for determining the actual measurements of the parcel based upon a pre-selected measurement scale; receives the calculated measurements from the calculator means; and then transmits the calculated measurements to a monitor and/or or to a parcel processing system. The monitor will display the calculated dimensions of the parcel for the use of the system operator, while the use of a parcel processing system allows the parcel dimensions to be further utilized for shipping and carrier processing.

In an alternative embodiment of the present invention, a conveyor belt for transporting a parcel to the measurement field can be utilized. The parcel can be pre-qualified as a candidate for dimensional weighing by determining the parcel's length and height while being transported by the conveyor belt.

To accomplish the limited measurement of a parcel while in transit, the parcel is placed onto a conveyor belt; to be transported into the field of measurement. A laser beam is transmitted from a transmitter located directly above and along the axis of the conveyor belt movement toward a mirror where the height of the parcel is predetermined. The mirror is located along the axis of the conveyor belt so that the parcel must pass the mirror while the parcel is on the conveyor belt. The mirror is further positioned at approximately a 45° angle relative to the laser beam so that the laser beam is deflected downward at an angle of approximately 45 onto the axis of the conveyor belt and toward an encoder bar located on the surface of the conveyor belt.

The laser beam is returned from the encoder bar to the mirror and then to a receiver co-located with the laser beam transmitter. During the transmission of the laser beam, a count is established which corresponds to a predetermined measurement scale. The count is continued until the transmission of the laser beam to the encoder bar is broken by passage of the parcel across the laser beam as the parcel passes the mirror. The count is restarted when the parcel has passed the mirror and transmission of the laser beam is no longer broken.

The length and height of the parcel are determined by calculating the period of time that the laser beam transmission was broken relative to the count while the laser beam transmission was not broken and then calculating an angle between laser bean and parcel at which the break occurred. The calculated length and height can then be displayed on a monitor and/or transmitted to a parcel processing system.

BRIEF DESCRIPTION OF THE DRAWINGS

FIGS. 3A and 3B are a flowchart of the method steps utilizing the system of FIG. 1.

DETAILED DESCRIPTION OF THE PREFERRED EMBODIMENTS

Figure 1:
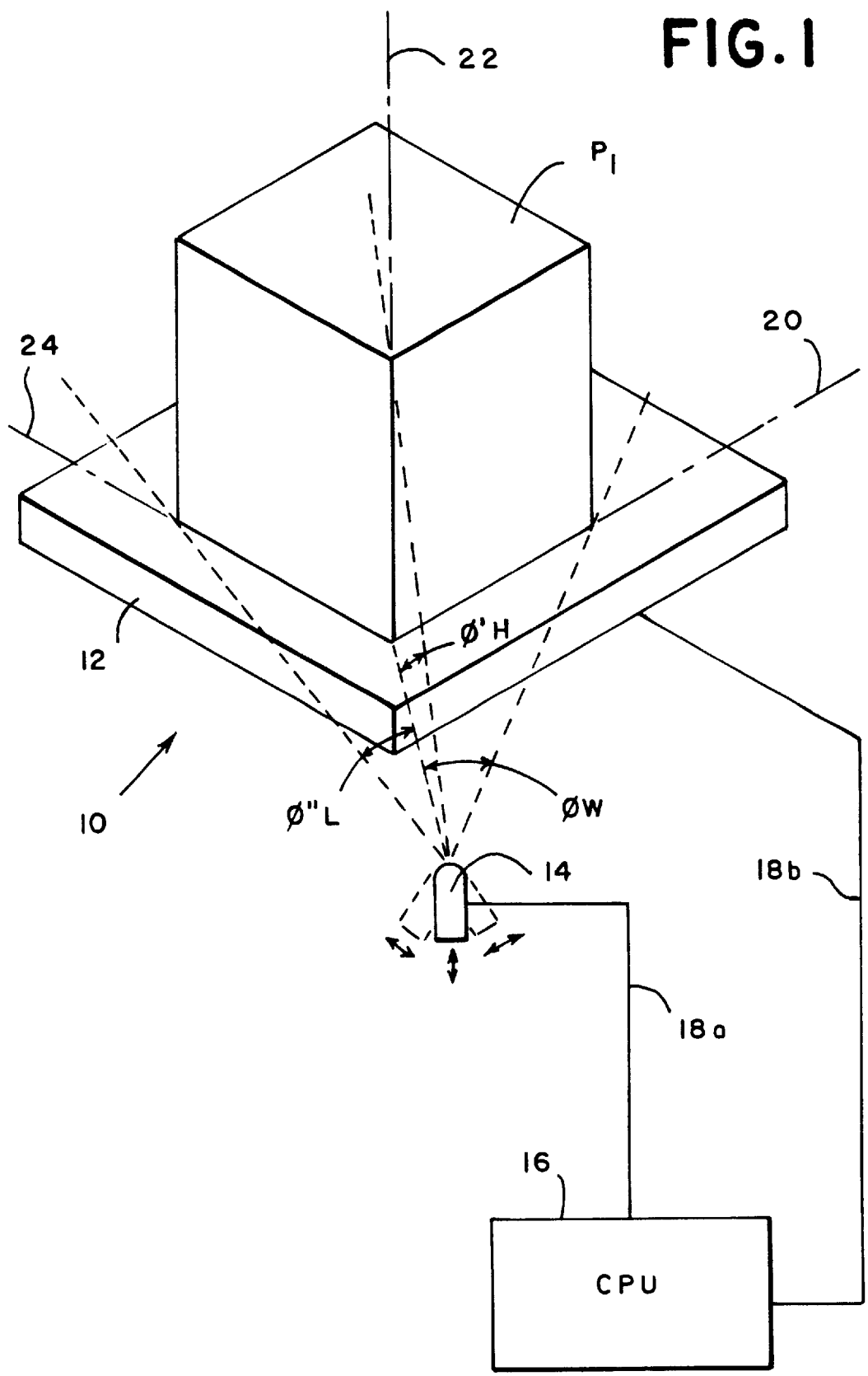
FIG. 1 is a diagram of the system of the invention showing a parcel placed within a field of measurement.

Turning to FIG. 1, there is shown parcel $P_1$ placed within a measuring field. System 10 comprises the measuring field.

System 10 includes platform 12 which can be a simple rectangular platform, or can be of any shape that will effectively accommodate a parcel or package (hereinafter collectively referred to as "parcels") to be measured. In a preferred embodiment of the invention, platform 12 is a weighing scale capable of weighing the parcels placed upon the weighing scale. The weight of the parcel is calculated and the data transmitted from the weighing scale, via interface cable 18b, to central processing unit or data processing device 16 (hereinafter "CPU 16").

The surface of platform 12 is marked in such a way that the parcel will be placed thereupon in the best location for being scanned for its dimensions. The markings form a right angle on the surface of the platform such that the 0, 0 (x and y axis respectively) coordinate point is directly opposite the closest corner of the platform that is bisected by the neutral position of the beam being emitted by laser scanner 14. The placing of the corner of the parcel in the 0, 0 position will form three baselines 20, 22, and 24.

The beam being emitted by laser scanner 14 bisects the closest corner of platform 12 while laser scanner 14 is in its neutral position. The movement of laser scanner 14 from its neutral position through one cycle of motion is continuous and at a constant rate. A full cycle of movement comprises three subcycles $D_1$, $D_2$, and $D_3$.

$D_1$ comprises a movement from the neutral position to the right through an angle of 45° while maintaining a position parallel to the surface below laser scanner 14, and thus along baseline 20; and additionally, a movement directly back to the neutral position along baseline 20. $D_2$ comprises a movement from the neutral position to the left through an angle of 45° while maintaining a position parallel to the surface below laser scanner 14, and thus along baseline 24; a movement directly back to the neutral position along baseline 24. $D_3$ comprises a movement from the neutral position up vertically through an angle of 90° and thus along baseline 22; then, a movement directly back to the neutral position along baseline 22. Laser scanner 14 is under the control of CPU 16 and the data that moves therebetween does so along interface cable 18a.

Laser scanner 14 emits a beam that has been calibrated so that laser scanner 14 will always return to the neutral position. The neutral position is known by CPU 16 such that an application program within CPU 16 will use the neutral position to begin to determine the linear dimensions of a parcel such as $P_1$. As laser scanner 14 begins movement $D_1$, it emits a beam that is directed along baseline 20 at the known starting point. Laser scanner 14 essentially simultaneously emits a beam of steady pulse as it receives reflections back from its path along baseline 20. The reflections back from baseline 20 are measured in terms of the signal strength, and relative angle of projection, in order to determine the length of the parcel that is along baseline 20. When the measurement of the signal strength no longer matches the expected signal strength, then the end of the parcel has been obtained and the linear measurement of the parcel lying along baseline 20 can be determined.

As laser scanner 14 begins movement $D_2$, it emits a beam that is directed along baseline 24 beginning at the known starting point 0,0. Laser scanner 14 essentially simultaneously emits a beam of steady pulse as it receives reflections back from its path along baseline 24. The reflections back from baseline 24 are measured in terms of the signal strength, and relative angle of projection, in order to determine the length of the parcel that is along baseline 24. When the measurement of the signal strength no longer matches the expected signal strength, then the end of the parcel has been obtained and the linear measurement of the parcel lying along baseline 24 can be determined.

As laser scanner 14 begins movement $D_3$, it emits a beam that is directed along baseline 22 beginning at the known starting point 0,0. Laser scanner 14 essentially simultaneously emits a beam of steady pulse as it receives reflections back from its path along baseline 22. The reflections back from baseline 22 are measured in terms of the signal strength, and relative angle of projection, in order to determine the length of the parcel that is along baseline 22. When the measurement of the signal strength no longer matches the expected signal strength, then the end of the parcel has been obtained and the linear measurement of the parcel lying along baseline 22 can be determined.

Figure 2:
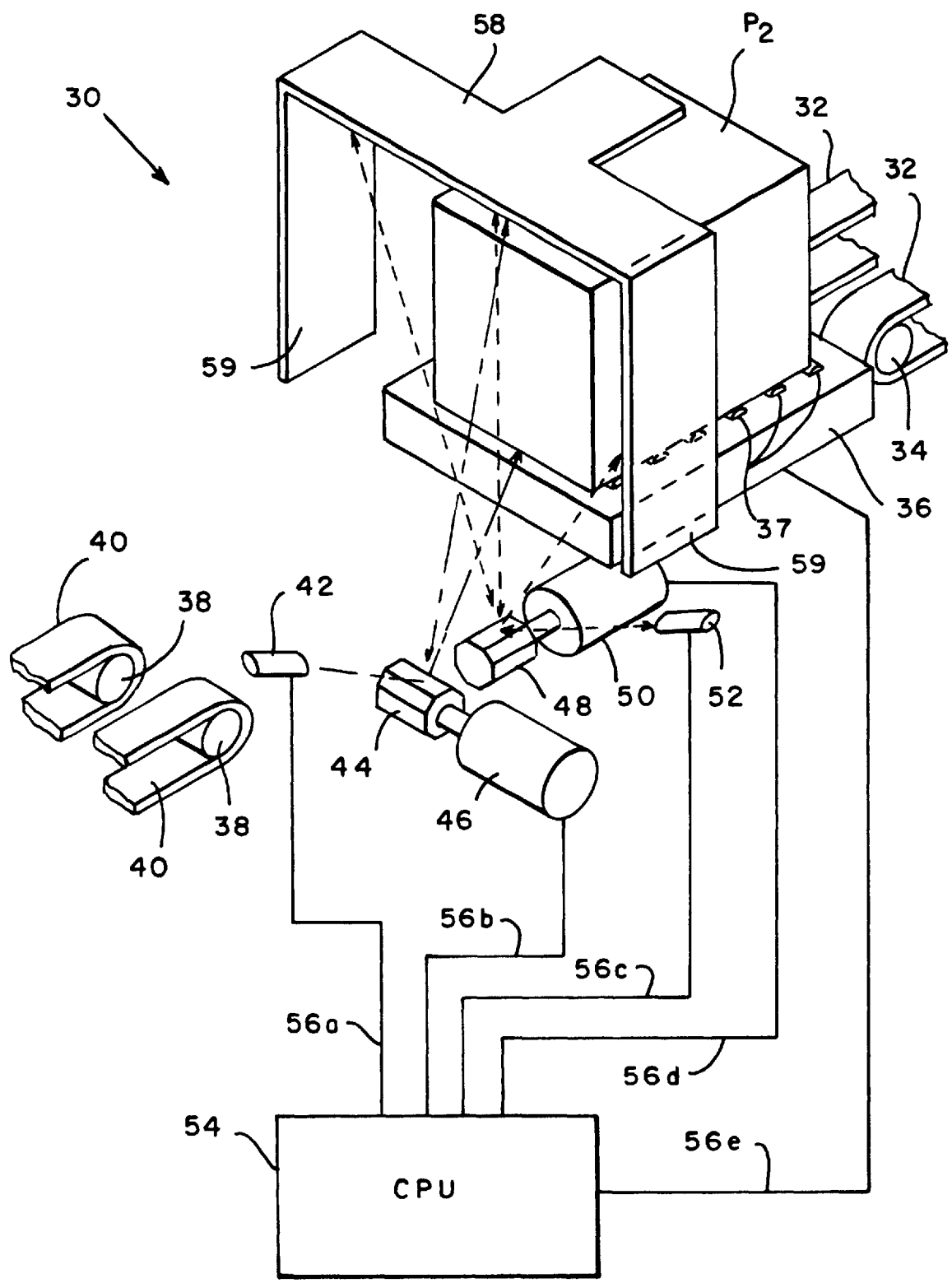
FIG. 2 is an alternative embodiment of the system of FIG. 1 wherein the parcel is in motion through the field of measurement.

Turning to FIG. 2, there is shown an alternative embodiment of the present invention wherein representative parcel $P_2$ is fed into the measuring field. System 30 comprises the measuring field.

System 30 includes intake belts 32 being driven by rollers 34 such that a parcel as represented by parcel $P_2$ is fed onto platform 36 which can be a simple rectangular platform, or can be of any shape that will effectively accommodate a parcel or package (hereinafter collectively referred to as "parcels") to be measured. The driving force of rollers 34 can be provided by motor means (not shown) or by the force of belts 32 being driven by motor means further up the conveyor (not shown). The driving action of conveyors is well known and need not be discussed herein for an understanding of the present invention.

In a preferred embodiment of the invention, platform 36 is a roller-top weighing scale capable of weighing the parcels being passed over a plurality of rollers 37 of the weighing scale. The weight of the parcel is calculated and the data transmitted from the weighing scale, via interface cable 56e, to central processing unit or data processing device 54 (hereinafter "CPU 54").

Parcel $P_2$ is fed from the surface of platform 36 by the movement of rollers 37 to outbound belts 40 driven by rollers 38. There is a gap between belts 40; the purpose of which is to allow laser scanner 42 to be placed in the feed path of parcel $P_2$. Slightly below laser scanner 42, and also in the feed path, is polygonal mirror 44 driven by motor means 46 under control of CPU 54 via interface cable 56b.

Laser scanner 42 and polygonal mirror 44 are located such that the beam being emitted by laser scanner 42 and reflected off of polygonal mirror 44 bisects the closest edge of platform 36 when laser scanner 42 is in its neutral position. The movement of laser scanner 42 from its neutral position through one cycle of motion is continuous and at a constant rate. A full cycle of movement comprises $D_4$.

$D_4$ comprises a movement from the neutral position up vertically through an angle of 90°; then, a movement directly back to the neutral position. The signal from laser scanner 42 is reflected back from reflective apparatus 58 that forms a bridge over the feed path. Reflective apparatus 58 comprises two upright legs 59. Half the width of upright legs 59 extend beyond platform 36, while the other half of the width of upright legs 59 is parallel to the sides of platform 36. Reflective apparatus 58 can be made of a substantially rigid material and is coated on its inside surface with a reflective coating. The reflective coating can be applied in any one of a number of ways that are well known in the art and need not be discussed here for an understanding of the present invention.

Laser scanner 42 is under the control of CPU 54 and the data that moves therebetween does so along interface cable 56a. Laser scanner 42 emits a beam that has been calibrated so that laser scanner 42 will always return to the neutral position. The neutral position is known by CPU 54 such that an application program within CPU 54 will use the neutral position to begin to determine the linear dimensions of a parcel such as $P_2$. As laser scanner 42 begins movement $D_4$, it emits a beam that is measured along a baseline beginning at the known starting point 0,0. Laser scanner 42 essentially simultaneously emits a beam of steady pulse as it receives reflections back from reflective apparatus 58 and traces its path along the baseline. The reflections back to laser scanner 42 are measured in terms of the signal strength, and relative angle of projection, in order to determine the length of the parcel moving through the parcel feed path. As representative parcel $P_2$ absorbs part of the beam of laser scanner 42 when parcel $P_2$ passes known starting point 0,0, the upward movement of the beam during $D_4$ sends back a steady stream of reflected signals that are reduced in strength relative to signals that are reflected from reflective apparatus 58. When the measurement of the signal strength no longer matches the expected signal strength, then the end of the parcel has been reached and the linear measurement of the height of the parcel passing through the feed path can be obtained. When the signal strength returns to the expected level, then the linear measurement of the length of the parcel can be obtained by factoring the angle of the laser beam projection together with the length of time of the reduced reflection and the speed of the belts 32 and 40.

The measurement of the width of the parcel passing through the feed path is obtained by measuring the signal strength transmitted by laser scanner 52 which is located to one side of the feed path of the advancing parcel. The beam emitted by laser scanner 52 is reflected off of rotating polygonal mirror 48 located within the gap of the parcel feed path and between platform 36 and rotating polygonal mirror 44. Rotating polygonal mirror 48 is driven by motor means 50 under control of CPU 54 via interface cable 56d.

Laser scanner 52 and polygonal mirror 48 are located such that the beam being emitted by laser scanner 52 and reflected off of polygonal mirror 48 can move across the reflective apparatus 58 from the neutral 0, 0 position to the bottom of one upright leg 59 of reflective apparatus 58, back through the neutral position, to the bottom of the other upright leg 59 and then back to the neutral position . The movement of laser scanner 52 from its neutral position through one cycle of motion is continuous and at a constant rate. A full cycle of movement comprises $D_5$.

Laser scanner 52 is under the control of CPU 54 and the data that moves therebetween does so along interface cable 56c. Laser scanner 52 emits a beam that has been calibrated so that laser scanner 52 will always return to the neutral position. The neutral position is known by CPU 54 such that an application program within CPU 54 will use the neutral position to begin to determine the linear dimensions of a parcel such as $P_2$. As laser scanner 52 begins movement $D_5$, it emits a beam that is measured along a baseline bisected by the known starting point 0,0. Laser scanner 52 essentially simultaneously emits a beam of steady pulse as it receives reflections back from reflective apparatus 58 and traces its path along the baseline, first to one side of the starting point 0, 0, then to the other side. The reflections back to laser scanner 52 are measured in terms of the signal strength, and relative angle of projection, in order to determine the width of the parcel moving through the parcel feed path. As representative parcel $P_2$ absorbs part of the beam of laser scanner 52 when parcel $P_2$ passes known starting point 0,0, the upward movement of the beam during $D_5$ sends back a steady stream of reflected signals that are reduced in strength relative to signals that are reflected from reflective apparatus 58. When the measurement of the signal strength no longer matches the expected signal strength, then the end of the parcel has been reached and the linear measurement of the width of the parcel passing through the feed path can be obtained.

There is a lower cost embodiment of the invention contemplated in which scanner 52, rotating polygonal mirror 48, and motor means 50, together with their applicable data interface cables 56c and 56d are eliminated from the embodiment shown in FIG. 2. This embodiment would eliminate the width calculation of the parcel being measured, but would provide a threshold measurement for determining if certain parcels should not be processed for shipping under dimensional weighing guidelines.

Figure 3A:
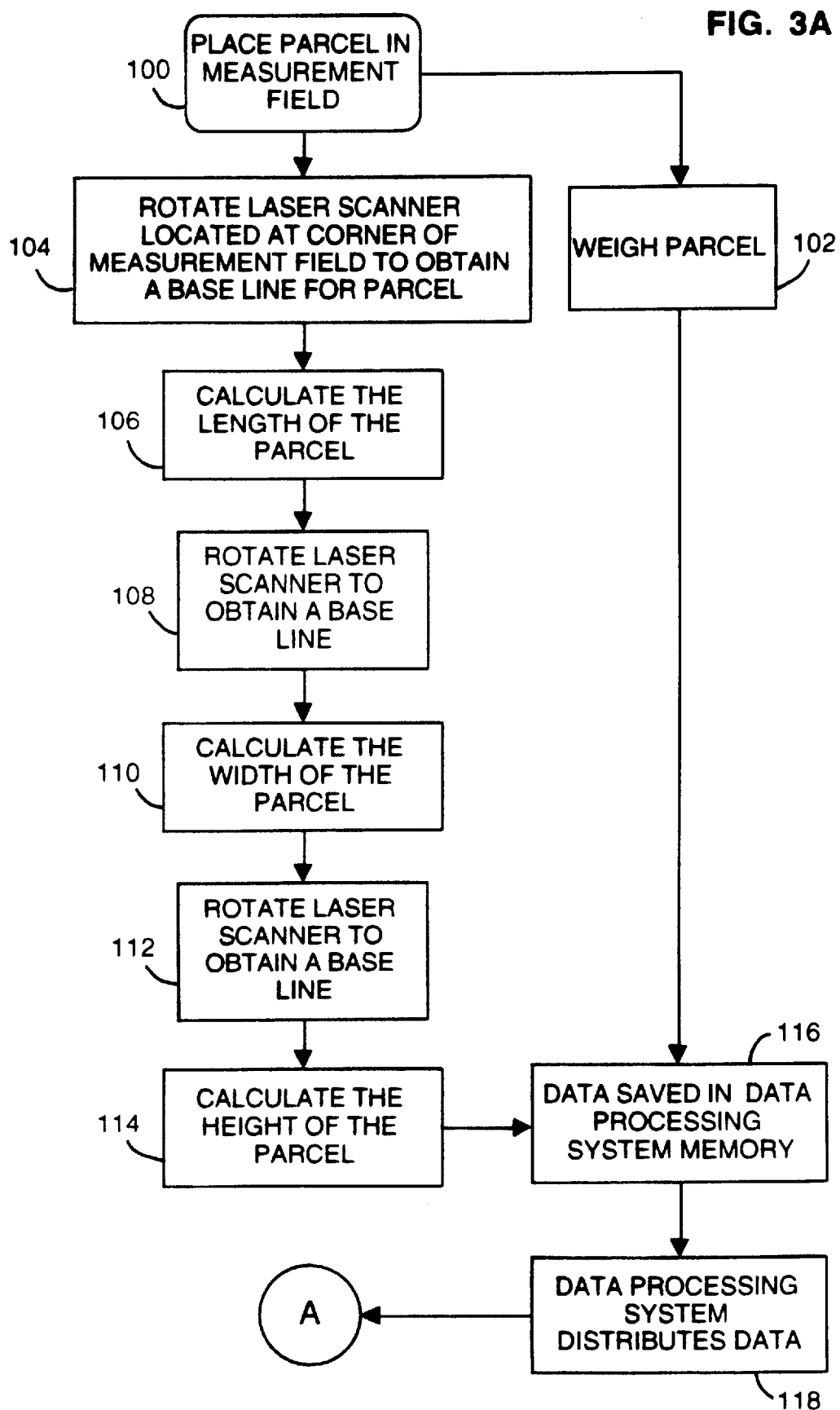

The processing steps of the embodiment described in FIG. 1 are shown in the flowchart of FIGS. 3A and 3B.

Turning to FIG. 3A, the method begins at step 100 when the parcel to be measured is placed on top of a platform within the field of measurement. From step 100, the method advances essentially simultaneously to steps 102 and 104. If the platform upon which the parcel has been placed is the surface of a weighing scale, then the weighing scale will determine the weight of the parcel at step 102 before advancing to step 116 where the weight data is stored in a memory of a data processing system. If the platform upon which the parcel has been placed is not the surface of a weighing scale, then the method will not perform step 102.

As the parcel is being weighed at step 102, or if the platform is not the surface of a weighing scale, the method performs step 104 where a laser scanner located at one corner of the field of measurement establishes three baselines at a corner of the parcel to be measured where such corner is in contact with the surface of the platform. The corner from which the baselines diverge is designated position 0, 0 in a coordinate field and will be referred to hereinafter as the "neutral position."

The laser scanner emits a beam that has been calibrated so that the laser scanner will always return to the neutral position upon completion of a measuring movement. The neutral position is known by the CPU that processes the data being received by the laser scanner such that an application program within the CPU will use the neutral position to begin to determine the linear dimensions of a parcel placed within the field of measurement.

The beam being emitted by the laser scanner bisects the closest corner of the platform upon which the parcel has been placed while the laser scanner is in its neutral position. The movement of the laser scanner from its neutral position through one cycle of motion is continuous and at a constant rate. A full cycle of movement comprises three subcycles $D_1$, $D_2$, and $D_3$.

Step 104 corresponds to movement $D_1$. $D_1$ comprises a movement from the neutral position to the right through an angle of 45° while maintaining a position parallel to the surface below the laser scanner, and thus along the baseline; and additionally, a movement directly back to the neutral position along the same baseline.

From step 104, the method advances to step 106 where the length of the parcel is calculated. The calculation is derived from a measurement of the intensity of a beam emitted by the laser scanner. The neutral position is known by the CPU that processes the data being received by the laser scanner such that an application program within the CPU will use the neutral position to begin to determine the linear dimensions of a parcel placed within the field of measurement. The reflections back from the baseline are measured in terms of the signal strength, and relative angle of projection, in order to determine the linear dimension of the parcel that is along the baseline. When the measurement of the signal strength no longer matches the expected signal strength, then the end of the parcel has been reached and the linear measurement of the parcel lying along that baseline can be determined.

From step 106 the method advances to step 108 where the laser scanner is rotated to measure along a baseline that is determinative of a linear measurement corresponding to the parcel's width. Step 108 corresponds to movement $D_2$. $D_2$ comprises a movement from the neutral position to the left through an angle of 45° while maintaining a position parallel to the surface below the laser scanner, and thus along the baseline; and additionally, a movement directly back to the neutral position along the same baseline. Step 108 advances to step 110 where the linear dimension corresponding to the parcel width is calculated in the same manner as the parcel length was calculated.

From step 110 the method advances to step 112 where the laser scanner is rotated to measure along a baseline that is determinative of a linear measurement corresponding to the parcel's height. Step 112 corresponds to movement $D_3$. $D_3$ comprises a movement from the neutral position up vertically through an angle of 90° and thus along the baseline; then, a movement directly back to the neutral position along the same baseline. Step 112 advances to step 114 where the linear dimension corresponding to the parcel height is calculated in the same manner as the parcel's length and width were calculated.

The method advances from step 114 to step 116 where the calculations derived from the measurement of the parcel's length, width, height, and weight are stored within a memory of the CPU for subsequent use in a parcel processing application program. From step 116, the method advances to step 118 where the stored data is distributed, under control of the CPU's application program, to those applications requiring the data as input.

From step 118, the method advances along path A to re-enter the method flow at step 120 as shown in FIG. 3B. At step 120, the system displays the calculated dimensions and weight of the parcel to be processed. Essentially simultaneously to step 120, the calculations are input to a parcel processing program within the CPU at step 122 which applies the data against a look-up table of values that correspond to a shipping charge as determined by a carrier's dimensional weighing guidelines. From step 122, the method advances to a query at step 124 which asks whether or not the calculated dimensions of the parcel exceed a predetermined threshold value. The threshold value is determined by the carrier based upon a number of factors which include: class of service, mode of carriage; ease of handling; and, dimension.

If the response to the query at step 124 is "YES," then the method advances to a query at step 128 which asks if there are special handling instructions associated with a parcel corresponding to the measurements of the subject parcel. If the response to the query is "NO," then the method advances to step 126. If the response to the query at step 128 is "YES," however, then the method advances directly to step 136 where the parcel is further handled according to predetermined criteria which may include: rejection of the parcel by the carrier; alternate means of carriage; application of a different table of values for determining carriage charges; or, application of a service charge.

Returning to step 124, if the response to the query at step 124 is "NO," however, then the method advances to step 126 where shipping charges are determined in respect of the parcel's dimensions and any other criteria established within the application program's data table values. From step 126 the method advances to step 130 where the system prepares shipping documentation which might comprise: shipping labels; waybills; and appropriate barcoding. The method then prepares a carrier manifest, at step 132, indicative of parcels prepared for shipping. The method then advances to step 134 where the parcel is placed into its proper shipping channel.

Figure 4A:
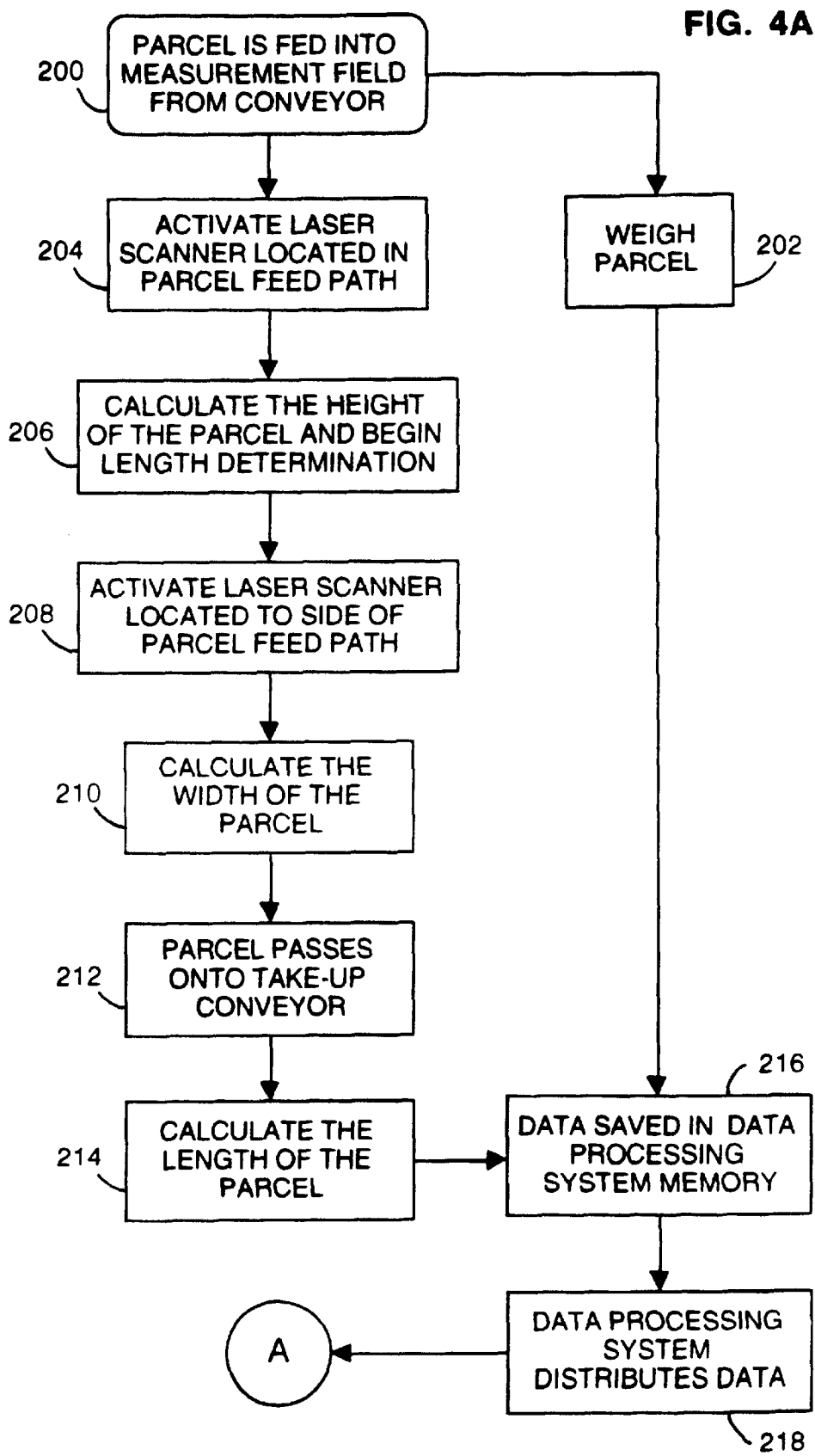
FIGS. 4A and 4B are a flowchart of the method steps utilizing the system of FIG. 2.
Figure 4B:
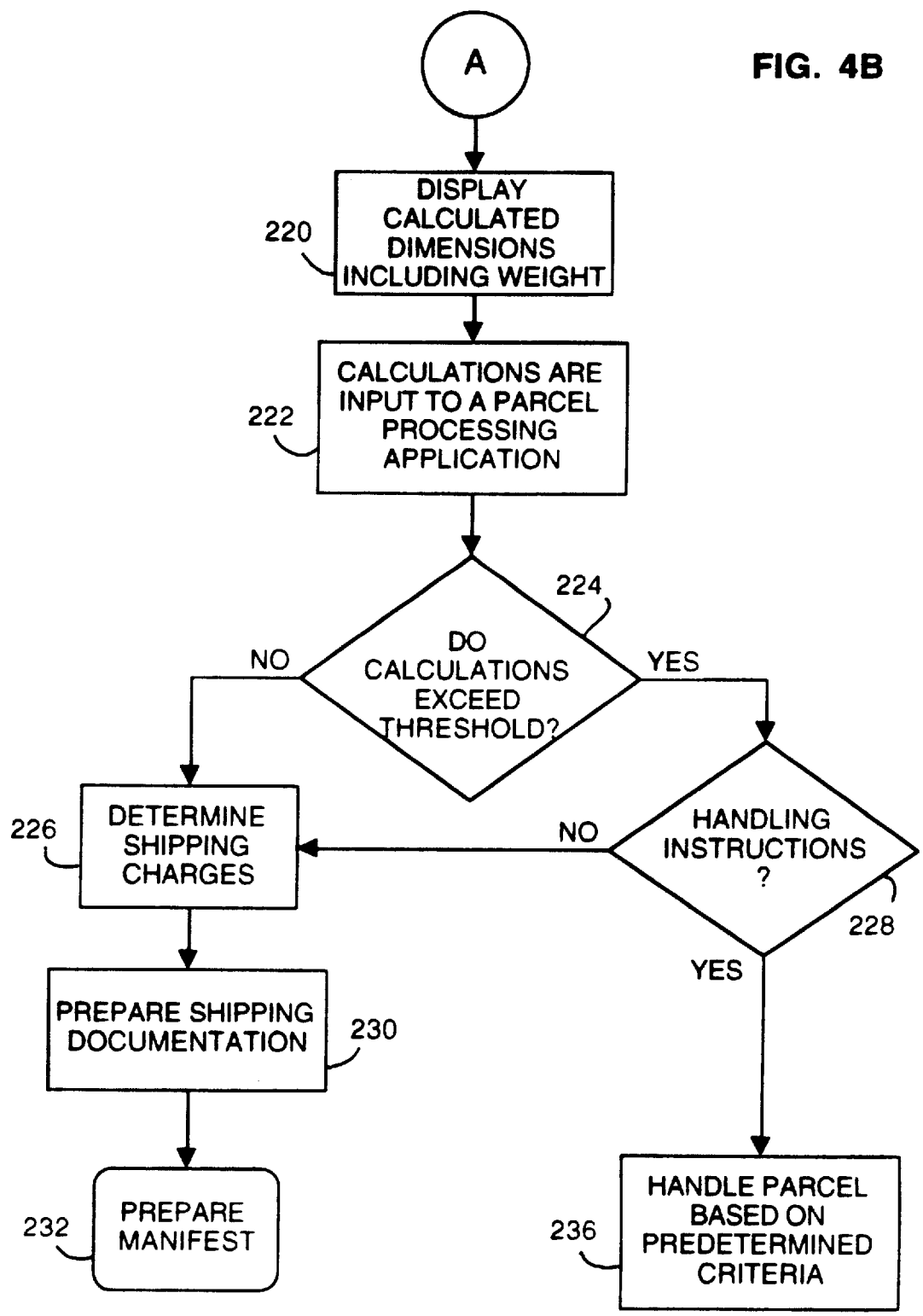

The processing steps of the embodiment described in FIG. 2 are shown in the flowchart of FIGS. 4A and 4B.

Turning to FIG. 4A, the method begins at step 200 when the parcel to be measured is transported into the field of measurement by a conveyor or similar apparatus. From step 200, the method advances essentially simultaneously to steps 202 and 204. If the platform upon which the parcel has been placed is the surface of a weighing scale, then the weighing scale will determine the weight of the parcel at step 202 before advancing to step 216 where the weight data is stored in a memory of a data processing system. If the platform upon which the parcel has been placed is not the surface of a weighing scale, then the method will not perform step 202.

As the parcel is being weighed at step 202, or if the platform is not the surface of a weighing scale, the method performs step 204. At step 204, the parcel is fed from the surface of the platform by the movement of rollers to outbound conveyor belts. There is a gap between the belts to allow a first laser scanner to be placed in the feed path of the parcel. Slightly below the first laser scanner, and also in the feed path, is a first polygonal mirror driven by motor means under the control of the CPU. The first laser scanner and the first polygonal mirror are located such that the beam being emitted by the first laser scanner is reflected off of the first polygonal mirror, bisecting the closest edge of the platform when the first laser scanner is in its neutral position. The movement of the first laser scanner from its neutral position through one cycle of motion is continuous and at a constant rate. A full cycle of movement comprises $D_4$.

Step 204 corresponds to movement $D_4$. $D_4$ comprises a movement from the neutral position up vertically through an angle of 90°; then, a movement directly back to the neutral position. The signal from the first laser scanner is reflected back from a reflective apparatus that forms a bridge over the feed path.

The first laser scanner is under the control of the CPU and the data that moves therebetween does so along an interface cable. The first laser scanner emits a beam that has been calibrated so that the first laser scanner will always return to the neutral position.

When the linear dimension, corresponding to the height of the parcel has been scanned by the first laser scanner then the method advances from step 204 to step 206. At step 206, the neutral position of the first laser scanner is known by the CPU such that an application program within the CPU will use the neutral position to begin to determine the linear dimensions of a parcel placed within the field of measurement. From step 206, the method advances to step 208.

At step 208, the parcel is fed from the surface of the platform, by the movement of rollers along its surface, to the outbound conveyor belts. There is a gap between the belts to allow a second laser scanner and a second polygonal mirror to be located such that the beam being emitted by the second laser scanner and reflected off of the second polygonal mirror can move across the reflective apparatus from a neutral position to the bottom of one upright leg of the reflective apparatus, back through the neutral position, to the bottom of the other upright leg and then back to the neutral position. The movement of the second laser scanner from its neutral position through one cycle of motion is continuous and at a constant rate. A full cycle of movement comprises $D_5$.

As the second laser scanner begins movement $D_5$, it emits a beam that is measured along a baseline bisected by the point represented by the neutral position. The second laser scanner essentially simultaneously emits a beam of steady pulse as it receives reflections back from the reflective apparatus, under which the parcel is passing, and traces its path along the baseline, first to one side of the neutral position, then to the other side. The reflections back to the second laser scanner are measured in terms of the signal strength, and relative angle of projection, in order to determine the width of the parcel moving through the parcel feed path. As the parcel absorbs part of the beam of the second laser scanner when the parcel passes the neutral position, the upward movement of the beam during $D_5$ sends back a steady stream of reflected signals that are reduced in strength relative to signals that are reflected from the reflective apparatus. When the measurement of the signal strength no longer matches the expected signal strength, then the end of the parcel has been reached and the linear measurement of the width of the parcel passing through the feed path can be obtained.

From step 208, the method advances to step 210 where the measurement of the width of the parcel passing through the feed path is obtained by measuring the signal strength transmitted by the second laser scanner.

The laser scanner emits a beam that has been calibrated so that the laser scanner will always return to the neutral position upon completion of a measuring movement. The neutral position is known by the CPU that processes the data being received by the laser scanner such that an application program within the CPU will use the neutral position to begin to determine the linear dimension corresponding to the width of the parcel placed within the field of measurement.

From step 210 the method advances to step 212 where the parcel passes beyond the ability of the first laser scanner to project a beam upon the parcel. The method then advances to step 212 where the system calculates the length of the parcel. By calculating the known time that the parcel was within the emission/reception field of the first laser scanner, relative to the speed of the parcel's movement, the length of the parcel can be determined. The determination is well known in the art and need not be discussed herein for an understanding of the subject invention.

The method advances from step 214 to step 216 where the calculations derived from the measurement of the parcel's length, width, height, and weight are stored within a memory of the CPU for subsequent use in a parcel processing application program. From step 216, the method advances to step 218 where the stored data is distributed, under control of the CPU's application program, to those applications requiring the data as input.

From step 218, the method advances along path A to re-enter the method flow at step 220 as shown in FIG. 4B. At step 220, the system displays the calculated dimensions and weight of the parcel to be processed. Essentially simultaneously to step 220, the calculations are input to a parcel processing program within the CPU at step 222 which applies the data against a look-up table of values that correspond to a shipping charge as determined by a carrier's dimensional weighing guidelines. From step 222, the method advances to a query at step 224 which asks whether or not the calculated dimensions of the parcel exceed a predetermined threshold value. The threshold value is determined by the carrier based upon a number of factors which include: class of service, mode of carriage; ease of handling; and, dimension.

If the response to the query at step 224 is "YES," then the method advances to a query at step 228 which asks if there are special handling instructions associated with a parcel corresponding to the measurements of the subject parcel. If the response to the query is "NO," then the method advances to step 226. If the response to the query at step 228 is "YES," however, then the method advances directly to step 236 where the parcel is further handled according to predetermined criteria which may include: rejection of the parcel by the carrier; alternate means of carriage; application of a different table of values for determining carriage charges; or, application of a service charge.

Returning to step 224, if the response to the query at step 224 is "NO," however, then the method advances to step 226 where shipping charges are determined in respect of the parcel's dimensions and any other criteria established within the application program's data table values. From step 226 the method advances to step 230 where the system prepares shipping documentation which might comprise: shipping labels; waybills; and appropriate barcoding. The method then prepares a carrier manifest, at step 232, indicative of parcels prepared for shipping. The method then advances to step 234 where the parcel is placed into its proper shipping channel.

As can be appreciated by those skilled in the art, a number of variations of the subject invention are possible. These variations include, but are not limited to: the ability of the system to select the order in which the baselines will be scanned to determine the linear measurements of the parcel; the use of a weighing scale as the platform within the field of measurement; the speed and characteristics of the conveyor apparatus utilized to transport parcels to and from the measurement field; and, the general abilities of the shipping system application utilized by the CPU.

Additional variations that are contemplated, include, but are not limited to: the shape or configuration of the platform for supporting the parcel or package to be measured; the sequence of laser scanner moves that comprise a cycle; the means for supporting the laser scanners; whether or not the system is a standalone system or a node within a network; and, the number of surfaces which the rotating mirrors possess.

It is to be understood that the present invention is not to be considered as limited to the specific embodiment described above and shown in the accompanying drawings, which merely illustrates the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method of utilizing an emitter/scanner device for measuring the dimensions of a parcel for use in a parcel processing application of a data processing device, and comprising the steps of:

(a) placing a parcel on a flat surface in a field of measurement; wherein said laser scanner/emitter is positioned either above or below said parcel; and said laser scanner/emitter is further positioned behind said parcel;

(b) rotating said laser scanner/emitter so as to locate the lead and trail edges of said parcel;

(c) calculating a length of said parcel by calculating the distance from said lead edge to said trail edge;

(d) rotating said laser scanner/emitter so as to locate a left side and a right side of said parcel;

(e) calculating a width of said parcel by calculating the distance from said left side to said right side;

(f) rotating said laser scanner/emitter so as to locate a top edge and a bottom edge of said parcel; and (g) calculating a height of said parcel by measuring the distance from said top edge to said bottom edge; and (h) applying said length, said width, and said height of said parcel to a predetermined list of values in a data table so as to determine a shipment value for said parcel based upon said application.

2. The method of claim 1, wherein said flat surface is the weighing surface of a scale capable of calculating a weight of said placed parcel.

3. The method of claim 1, wherein said calculated length, width, and height are displayed on a display field or a monitor.

4. The method of claim 1, wherein said calculated length, width, and height are transmitted to said parcel processing system.

5. The method of claim 1, wherein said calculated weight is displayed on said display field or on said monitor.

6. The method of claim 2, wherein said calculated weight is transmitted to said parcel processing system.

7. The method of claim 6, wherein said calculated weight of said parcel is applied to a predetermined list of values in a data table so as to determine a shipment value for said parcel based upon said application.

8. An apparatus for measuring the dimensions of a parcel comprising:
   (a) a supporting means for supporting a parcel placed thereupon for measurement;
   (b) a laser scanner/emitter means for rotatably scanning a predetermined field for measurement data wherein said measurement data is representative of said parcel's length, said parcel's height, and/or said parcel's width; and, wherein:
      (i) said laser scanner emitter means is located in a measured position from a predetermined point of said supporting means:
      (ii) said laser scanner emitter emits a beam toward said supporting means along a baseline; and
      (iii) said laser scanner/emitter means receives a reflection of said emitted beam and said received beam is used to determine said measurement data;
   (c) calculator means for calculating said parcel's length, said parcel's height, and said parcel's width from said measurement data;
   (d) data processing means for:
      (i) controlling rotational movement of said laser scanner means;
      (ii) receiving and essentially simultaneously processing measurement data from said laser scanner/emitter means;
      (iii) transmitting said measurement data to said calculator means to determine said actual measurements based on a pre-selected measurement scale;
      (iv) receiving said actual measurements from said calculator means; and
      (v) transmitting said actual measurements to a display means and/or to a parcel processing system; and
   (e) determination means for determining a shipment cost for transporting said parcel to a destination as a function of said actual measurements as applied to a rate table.

9. The apparatus of claim 8 wherein said supporting means is the weighing surface of a scale capable of calculating a weight of said placed parcel.

10. The apparatus of claim 8, wherein said calculated length, width and height are displayed on a display means.

11. The apparatus of claim 8, wherein said calculated length, width and height are transmitted to a parcel processing system.

12. The apparatus of claim 8, wherein said calculated weight is displayed on said display means.

13. The apparatus of claim 8, wherein said calculated weight is transmitted to said parcel processing system.

14. The apparatus of claim 8, wherein said beam is directed along said baseline and wherein said direction is initiated at said pre-determined point of said supporting means.

15. The apparatus of claim 8, wherein said reflection of said beam is received and measured with respect to its relative signal strength and relative angle of emission to determine the length of the parcel along said baseline.

16. The apparatus of claim 8, wherein said relative signal strength is based upon a comparison of an expected signal strength to a received signal strength.

17. A method for measuring the dimensions of a parcel, comprising the steps of:
   (a) placing a parcel onto a conveyor belt;
   (b) moving said conveyor belt so that said parcel is transported into a field of measurement;
   (c) transmitting a laser beam from a transmitter located directly above and along an axis of said conveyor belt movement toward a mirror wherein the positioning of said transmitter is predetermined; said mirror located along said axis so that said parcel must pass said mirror while said parcel is placed on said conveyor belt; said mirror further positioned at approximately a 45° angle relative to said laser beam so that said laser beam is deflected downward at an angle of approximately 45° onto said axis of said conveyor belt and toward an encoder bar located on the surface of said conveyor belt;
   (d) reflecting said laser beam from said encoder bar to said mirror and from said mirror to a receiver co-located with said transmitter;
   (e) establishing a count during said transmission of said laser beam wherein said count corresponds to at least one predetermined measurement scale;
   (f) continuing said count until said transmission of said laser beam to said encoder bar is broken by passage of said parcel across said laser beam as said parcel passes said mirror;
   (g) restarting said count when said parcel has passed said mirror and said transmission of said laser beam is no longer broken;
   (h) determining a length and a height of said parcel by calculating a period of time that said laser beam transmission was broken relative to said count and when said laser beam transmission was not broken; and
   (i) calculating an angle between said laser beam and said parcel at which said laser beam transmission was broken.

18. The method of claim 17, wherein said calculated length and height are displayed on a display or monitor.

19. The method of claim 17, wherein said calculated length and height are transmitted to a parcel processing system.

* * * * *